(12) United States Patent  
Elkady et al.

(10) Patent No.: US 8,099,960 B2
(45) Date of Patent: Jan. 24, 2012

(54) TRIPLE COUNTER ROTATING SWIRLER AND METHOD OF USE

(75) Inventors: Ahmed Mostafa Elkady, Clifton Park, NY (US); Andrei Tristan Evulet, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 1203 days.

(21) Appl. No.: 11/560,931

(22) Filed: Nov. 17, 2006

(65) Prior Publication Data

US 2008/0115501 A1    May 22, 2008

(51) Int. Cl.
*F02C 1/00* (2006.01)
*F02C 7/08* (2006.01)

(52) U.S. Cl. .................. 60/748; 60/737; 60/738

(58) Field of Classification Search .......... 60/737, 60/748, 738
See application file for complete search history.

(56) References Cited

U.S. PATENT DOCUMENTS

| | | | |
|---|---|---|---|
| 5,165,241 A | 11/1992 | Joshi et al. | |
| 5,193,346 A * | 3/1993 | Kuwata et al. | 60/737 |
| 5,251,447 A | 10/1993 | Joshi et al. | |
| 5,351,477 A | 10/1994 | Joshi et al. | |
| 5,680,766 A | 10/1997 | Joshi et al. | |
| 5,836,164 A * | 11/1998 | Tsukahara et al. | 60/733 |
| 6,272,840 B1 * | 8/2001 | Crocker et al. | 60/776 |
| 6,389,815 B1 * | 5/2002 | Hura et al. | 60/746 |
| 6,862,889 B2 * | 3/2005 | Held et al. | 60/747 |
| 6,986,255 B2 * | 1/2006 | Smith et al. | 60/776 |
| 7,090,205 B2 * | 8/2006 | Oda et al. | 261/78.1 |
| 7,434,401 B2 * | 10/2008 | Hayashi | 60/743 |
| 2002/0092302 A1 * | 7/2002 | Johnson et al. | 60/737 |
| 2004/0103664 A1 * | 6/2004 | Held et al. | 60/746 |
| 2007/0289306 A1 * | 12/2007 | Suria et al. | 60/748 |
| 2008/0078181 A1 * | 4/2008 | Mueller et al. | 60/776 |
| 2008/0163627 A1 * | 7/2008 | ELKady et al. | 60/737 |

OTHER PUBLICATIONS

Elkady, et al., Filing Date Jan. 10, 2007, U.S. Appl. No. 11/621,705.

* cited by examiner

*Primary Examiner* — Ehud Gartenberg
*Assistant Examiner* — Gerald Sung
(74) *Attorney, Agent, or Firm* — Mark A. Conklin; GE Global Patent Operation (57) ABSTRACT

A fuel-air mixer includes an annular shroud, inner and outer counter-rotating swirlers, a hub separating the inner and outer swirlers, a center body extending axially along the annular shroud, a fuel shroud disposed radially outwardly from the outer swirler circumferentially around the annular shroud, and a radial swirler disposed downstream of the inner and outer swirlers, the radial swirler being configured to allow an independent radial rotation of a second gas stream entering the annular shroud from a region outside a wall of the annular shroud separately from a stream flowing through the inner and outer swirlers, the radially rotating second gas stream entering the annular shroud at a region adjacent an outer wall of the annular shroud.

16 Claims, 4 Drawing Sheets

TRIPLE COUNTER ROTATING SWIRLER AND METHOD OF USE

BACKGROUND OF THE INVENTION

1. Field of the Invention

Embodiments of the present invention relate in general to combustors and, more particularly, to fuel-air mixers of lean-premixed combustors for use in low-emission combustion processes.

2. Description of the Related Art

Historically, the extraction of energy from fuels has been carried out in combustors with diffusion-controlled (also referred to as non-premixed) combustion where the reactants are initially separated and reaction occurs only at the interface between the fuel and oxidizer, where mixing and reaction both take place. Examples of such devices include, but are not limited to, aircraft gas turbine engines and aero-derivative gas turbines for applications in power generation, marine propulsion, gas compression, cogeneration, and offshore platform power to name a few. In designing such combustors, engineers are not only challenged with persistent demands to maintain or reduce the overall size of the combustors, to increase the maximum operating temperature, and to increase specific energy release rates, but also with an ever increasing need to reduce the formation of regulated pollutants and their emission into the environment. Examples of the main pollutants of interest include oxides of nitrogen ($NO_x$), carbon monoxide (CO), unburned and partially burned hydrocarbons, and greenhouse gases, such carbon dioxide ($CO_2$). Because of the difficulty in controlling local composition variations in the flow due to the reliance on fluid mechanical mixing while combustion is taking place, peak temperatures associated with localized stoichiometric burning, residence time in regions with elevated temperatures, and oxygen availability, diffusion combustors offer a limited capability to meet current and future emission requirements while maintaining the desired levels of increased performance.

Recently, lean-premixed combustors have been used to further reduce the levels of emission of undesirable pollutants. In these combustors, proper amounts of fuel and oxidizer are well mixed in a mixing chamber or region by use of a fuel-air mixer prior to the occurrence of any significant chemical reaction in the combustor, thus facilitating the control of the above-listed difficulties of diffusion combustors and others known in the art. Conventional fuel-air mixers of premixed burners incorporate sets of inner and outer counter-rotating swirlers disposed generally adjacent an upstream end of a mixing duct for imparting swirl to an air stream. Different ways to inject fuel in such devices are known, including supplying a first fuel to the inner and/or outer annular swirlers, which may include hollow vanes with internal cavities in fluid communication with a fuel manifold in the shroud, and/or injecting a second fuel into the mixing duct via cross jet flows by a plurality of orifices in a center body wall in flow communication with a second fuel plenum. In such devices, high-pressure air from a compressor is injected into the mixing duct through the swirlers to form an intense shear region and fuel is injected into the mixing duct from the outer swirler vane passages and/or the center body orifices so that the high-pressure air and the fuel is mixed before a fuel/air mixture is supplied out the downstream end of the mixing duct into the combustor, ignited, and ignited.

Because of the cross jet flow and localized fuel injection points and the way the swirl is imparted, fuel concentrations in conventional fuel-air mixers are highest near the mixer walls at an exit plane, thus preventing the control of the local variation of fuel concentration at the exit of the mixing duct, particularly when considering the need for combustors capable of operating properly with a wide range of fuels, including, but not limited to, natural gas, hydrogen, and synthesis fuel gases (also known as syngas), which are gases rich in carbon monoxide and hydrogen obtained from gasification processes of coal or other materials. Therefore, the fuel concentration profile delivered to the flame zone may contain unwanted spatial variations, thus minimizing the full effect of premixing on the pollutant formation process as well as possibly affecting the overall flame stability in the combustion zone.

Therefore, a need exist for a fuel-air mixer for use in lean-premixed combustors having enhanced capabilities to control the local variation of fuel concentration at an exit thereof while maintaining control of flow separation and flame holding in the mixing duct. This increased control will permit the development of premixing devices having a reduced length without substantially affecting the overall pressure drop in the device.

SUMMARY OF THE INVENTION

One or more of the above-summarized needs and others known in the art are addressed by fuel-air mixers that include an annular shroud defined by a wall, first and second swirlers disposed at an upstream end portion of the annular shroud, the second swirler being disposed radially outwardly from the first swirler, a hub separating the first and second swirlers, a center body extending axially along the annular shroud, a fuel shroud disposed circumferentially around the annular shroud at the upstream end portion thereof, and a third swirler disposed downstream of the inner and outer swirlers, the third swirler being configured to impart an independent rotation on a second gas stream entering the third swirler from a region outside the annular shroud adjacently the annular shroud wall. Embodiments of the invention disclosed also include low-emission combustors and gas turbine combustors having the above-summarized fuel-air mixers.

In another aspect of the disclosed invention, gas turbines are disclosed that include a compressor, a combustor to burn a premixed mixture of fuel and air in flow communication with the compressor, and a turbine located downstream of the combustor to expand high-temperature gas stream exiting the combustor. The combustors of such gas turbines have fuel-air mixers that include an annular shroud defined by a wall, first and second swirlers disposed at an upstream end portion of the annular shroud, the second swirler being disposed radially outwardly from the first swirler, a hub separating the first and second swirlers, a center body extending axially along the annular shroud, a fuel shroud disposed circumferentially around the annular shroud at the upstream end portion thereof, and a third swirler disposed downstream of the inner and outer swirlers, the third swirler being configured to impart an independent rotation on a second gas stream entering the third swirler from a region outside the annular shroud adjacent to the annular shroud wall.

In another aspect of the disclosed invention, gas-to-liquid systems are disclosed that include an air separation unit configured to separate oxygen from air, a gas processing unit for preparing natural gas, a combustor for reacting oxygen with the natural gas at an elevated temperature and pressure to produce a synthesis gas enriched with carbon monoxide and hydrogen gas, and a turbo-expander in flow communication with the combustor for extracting work from and for quenching the synthesis gas. The combustor of such gas-to-liquid systems including fuel-air mixers having an annular shroud defined by a wall, first and second swirlers disposed at an upstream end portion of the annular shroud, the second swirler being disposed radially outwardly from the first swirler, a hub separating the first and second swirlers, a center body extending axially along the annular shroud, a fuel shroud disposed circumferentially around the annular shroud at the upstream end portion thereof, and a third swirler disposed downstream of the inner and outer swirlers, the third swirler being configured to impart an independent rotation on a second gas stream entering the third swirler from a region outside the annular shroud adjacently the annular shroud wall.

Methods for premixing a fuel and an oxidizer in a combustion system are also within the scope of the embodiments of the invention disclosed, such methods including the steps of drawing a first stream of oxidizer inside an annular shroud of a fuel-air mixer, swirling a first portion of the first stream of oxidizer in a first swirler in a first direction, swirling a second portion of the first stream of oxidizer in a second swirler in a second direction, the second direction being opposite to the first direction, injecting the fuel into the fuel-air mixer from a fuel shroud, drawing a second gaseous stream inside the annular shroud, and swirling the second gaseous stream in a third swirler, the third swirler being disposed downstream of the axial location of the fuel shroud and the first and second swirlers, the second gaseous stream being drawn from a region outside the annular shroud, and the swirling of the second gaseous stream being such as to control a fuel concentration near a wall of the annular shroud at an exit of the annular shroud.

The above brief description sets forth features of the present invention in order that the detailed description thereof that follows may be better understood, and in order that the present contributions to the art may be better appreciated. There are, of course, other features of the invention that will be described hereinafter and which will be for the subject matter of the appended claims.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the different views, several embodiments of the fuel-air mixer devices being disclosed will be described. In the explanations that follow, exemplary embodiments of the disclosed fuel-air mixers used in a gas turbine will be used. Nevertheless, it will be readily apparent to those having ordinary skill in the applicable arts that the same fuel-air mixers may be used in other applications in which combustion is primarily controlled by premixing of a fuel and an oxidizer.

Figure 1:
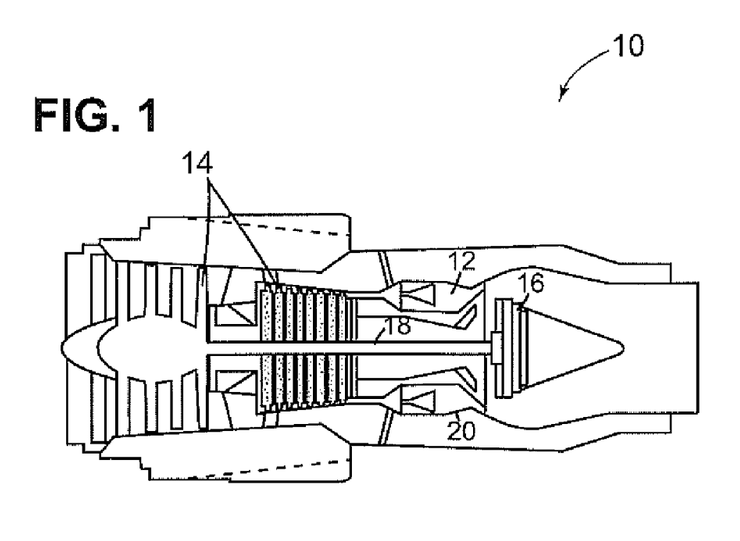
FIG. 1 is a diagrammatical illustration of a gas turbine having a combustor with a fuel-air mixer in accordance with aspects of the present technique.

FIG. 1 illustrates a gas turbine 10 having a compressor 14, which, in operation, supplies high-pressure air to a low-emission combustor 12. Subsequent to combustion of fuel injected into the combustor 12 with air (or another oxidizer), high-temperature combustion gases at high pressure exit the combustor 12 and expands through a turbine 16, which drives the compressor 14 via a shaft 18. As understood by those of ordinary skill in the art, references herein to air or airflow also refers to any other oxidizer, including, but not limited to, pure oxygen. In one embodiment, the combustor 12 includes a can combustor. In an alternate embodiment, the combustor 12 includes a can-annular combustor or a purely annular combustor. Depending on the application, the combustion gases may be further expanded in a nozzle (not shown) in order to generate thrust or gas turbine 10 may have an additional turbine (not shown) to extract additional energy from the combustion gases to drive an external load. As illustrated in FIG. 1, the combustor 12 includes a combustor housing 20 defining a combustion area. In addition, as further explained below and illustrated in FIGS. 2-5, the combustor 12 includes a fuel-air mixer for mixing compressed air and fuel prior to combustion in the combustion area.

Figure 2:
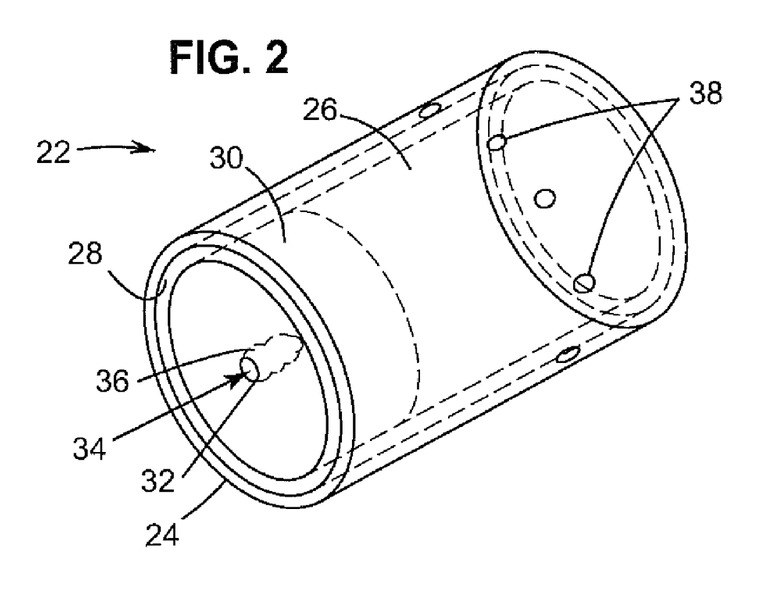
FIG. 2 is a diagrammatical illustration of an exemplary configuration of a low-emission can combustor employed in the gas turbine of FIG. 1 in accordance with aspects of the present technique.

FIG. 2 illustrated an exemplary configuration of a low-emission combustor 22 employed in the gas turbine 10 of FIG. 1. In the illustrated embodiment, the combustor 22 includes a can combustor with a single fuel-air mixer; however, those of ordinary skill in the art will appreciate that a plurality of mixers may also be used in a given combustor can, depending on the application and desired output. The combustor 22 includes a combustor casing 24 and a combustor liner 26 disposed within the combustor casing 24. The combustor 22 also includes a dome plate 28 and a heat shield 30 configured to reduce the temperature of the combustor walls.

Further, the combustor 22 includes a fuel-air mixer 32 for premixing the oxidizer and fuel prior to combustion. Although FIG. 2 illustrates a can combustor with a single fuel-air mixer 32, those of ordinary skill in the art will appreciate that can combustors having a plurality of fuel-air mixers 32 are also within the scope of the disclosed invention. In one embodiment, the fuel-air mixers 32 may be arranged to achieve staged fuel introduction within the combustor 22 for applications employing fuels such as hydrogen. In operation, the fuel-air mixer 32 receives an airflow 34, which is mixed with the fuel introduced into the fuel-air mixer 32 from a fuel plenum. Subsequently, the air-fuel mixture is burned in flame 36 inside the combustor 22. Dilution or cooling holes 38 may also be provided in the casing 24, as illustrated.

Figure 3:
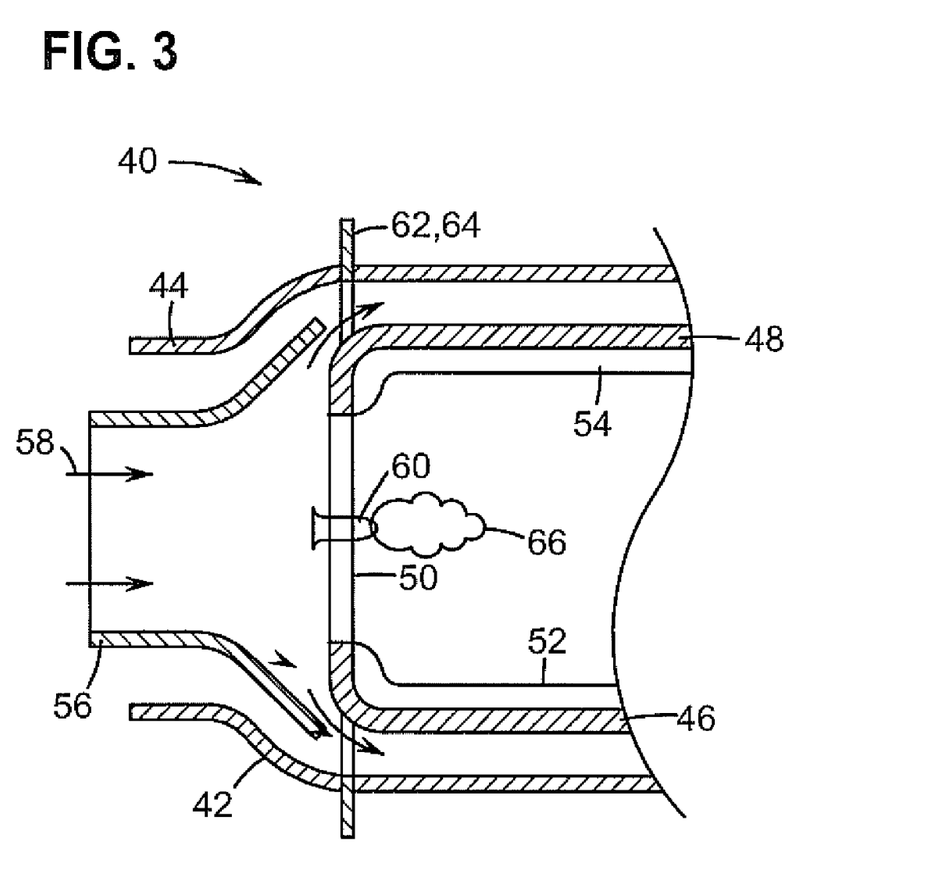
FIG. 3 is a diagrammatical illustration of another exemplary configuration of a low-emission annular combustor employed in the gas turbine of FIG. 1 in accordance with aspects of the present technique.

FIG. 3 illustrates another exemplary configuration of a low-emission combustor 40 employed in the gas turbine 10 of FIG. 1. In the illustrated embodiment, the combustor 40 includes an annular combustor with a single fuel-air mixer; however, those of ordinary skill in the art will appreciate that a plurality of circumferentially disposed mixers may also be used in a given annular combustor, depending on the application and desired output. As illustrated, an inner casing 42 and an outer casing 44 define the combustion area within the combustor 40. In addition, the combustor 40 typically includes inner and outer combustor liners 46 and 48 and a dome 50. Further, the combustor 40 includes inner and outer heat shields 52 and 54 disposed adjacent to the inner and outer combustor liners 46 and 48 and a diffuser section 56 for directing an airflow 58 into the combustion area. The combustor 40 also includes a fuel-air mixer 60 disposed upstream of the combustion area. In operation, the fuel-air mixer 60 receives fuel from a fuel plenum via fuel lines 62 and 64. Further, the fuel from the fuel lines 62 and 64 is mixed with the incoming airflow 58 and a fuel-air mixture for combustion is delivered to flame 66.

Figure 4:
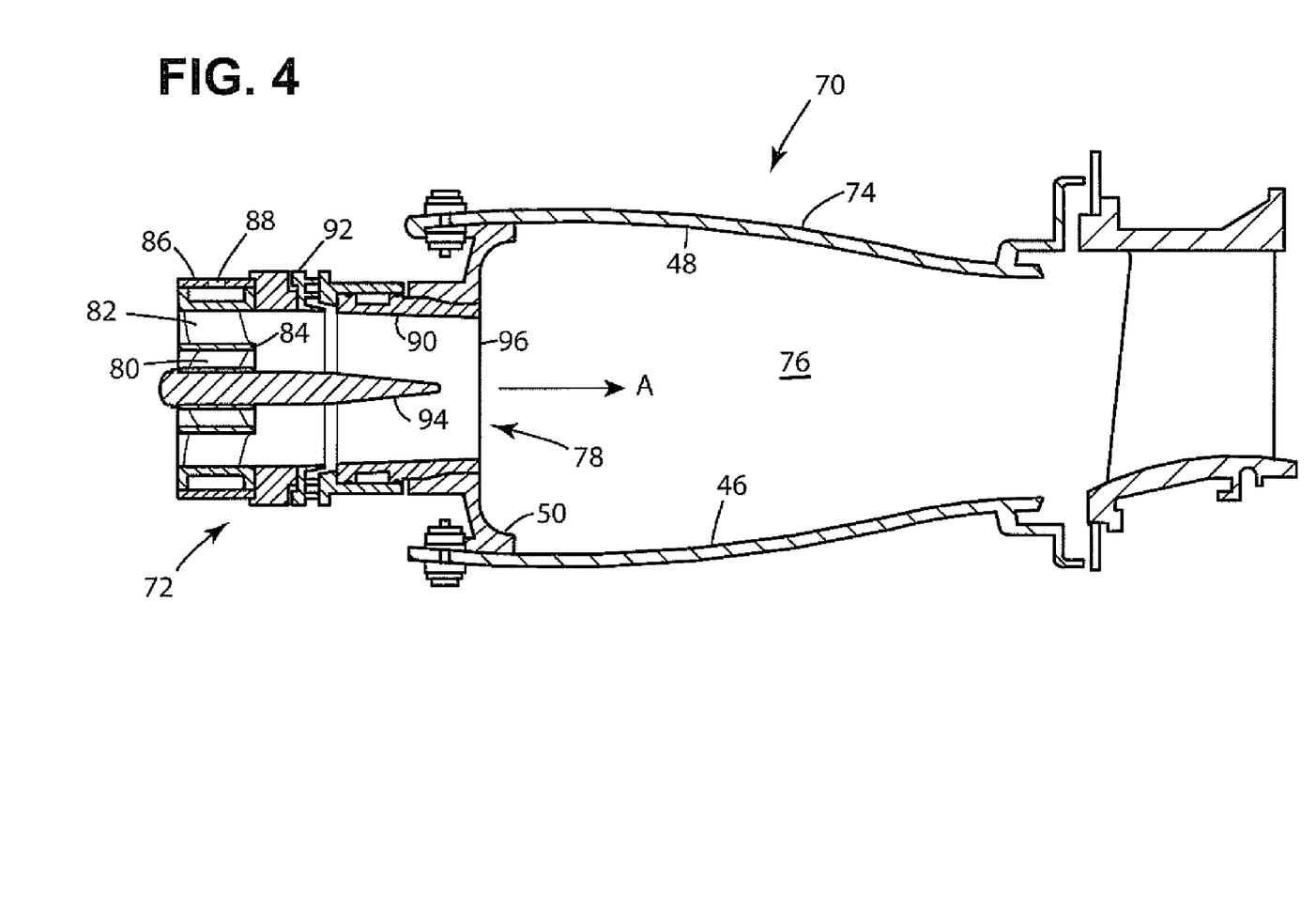
FIG. 4 is a partial cross-sectional view of another exemplary low-emission annular combustor having a fuel-air mixer in accordance with aspects of the present technique.

FIG. 4 depicts a partial cross sectional view of another exemplary low-emission annular combustor 70 having a fuel-air mixer 72 in accordance with aspects of the present technique. As those of ordinary skill will understand, the annular combustor 70 is a continuous burning combustion apparatus of the type suitable for use in the gas turbine engine 10 and includes a hollow body 74 that defines a combustion chamber 76 therein. Hollow body 74 is generally annular in form and includes the outer liner 48, the inner liner 46, and the domed end or dome 50. As shown, the domed end 50 of hollow body 74 is connected to the fuel-air mixer 72 to allow for the subsequent introduction of the fuel-air mixture from the fuel-air mixer 72 into combustion chamber 76 with the minimal formation of pollutants caused by the ignition of the resulting mixture. Other than the modifications described herein, the fuel-air mixer 72 will generally take the form of the mixers in U.S. Pat. Nos. 5,351,477, 5,251,447 and 5,165,241, which are commonly assigned to the assignee of the present invention and the contents of which are hereby incorporated by reference in their entirety.

As illustrated, the fuel-air mixer 72 includes an inner swirler 80 and an outer swirler 82. The inner and outer swirlers 80 and 82 preferably are counter-rotating. As understood by those of ordinary skill in the art, it matters not in which direction the inner swirler 80 or the outer swirler 82 rotates the air flowing therethrough, as long as the direction of rotation of one swirler is opposite to that of the other. A hub 84 separates the inner and outer swirlers 80 and 82 from each other, allowing the inner and outer swirlers 80 and 82 to be co-annular and to separately rotate air entering them. The inner and outer swirlers 80 and 82 are preferably axial, but they may be radial or some combination of axial and radial.

As known by those of ordinary skill in the applicable arts, the inner and outer swirlers 80 and 82 have vanes that are disposed at an angle varying from about 40° to about 60° with an axial axis A of the combustor. In addition, a ratio of the mass of air flowing through the inner swirler 80 to that flowing through the outer swirler 82 may be adjusted by design, being preferably approximately equal to one third.

The fuel-air mixer 72 further includes a fuel shroud 86 with a fuel inlet 88, the fuel shroud 86 circumferentially surrounding the mixer at an upstream end thereof, and an annular shroud 90 disposed downstream of the fuel shroud 86. The fuel shroud 86 may be in flow communication with the vanes of the outer swirler 82 and fuel injected therefrom may be metered by an appropriate fuel supply and control mechanism as conventionally known. As such, the vanes of the outer swirler 82 are preferably of a hollow design having internal cavities connected to the fuel shroud 86 and fuel passages to inject the fuel from the fuel shroud 86 into the annular shroud 90. As it also known conventionally, although not depicted in the figures, fuel passages could be provided in flow communication with the vanes of the inner swirler 80.

Although not illustrated, those of ordinary skill in the art will appreciate that the wall forming the annular shroud 90 may include one or more air passages in flow communication with compressed air from outside the annular shroud 90 so as to permit air to flow inside the annular shroud 90 in order to energize a boundary layer of air and fuel located along an inner surface of the annular shroud 90. These airflow passages may be implemented regardless of the manner in which fuel is injected into the fuel-air mixer 72 or how the fuel and air is mixed therein. This is because the air supplied by such air passages will be effective for energizing the boundary layer along the inner annular surface of the annular shroud 90 and increase the forward velocity of air in the annular shroud 90. Moreover, the air will also have the effect of diluting the concentration of any fuel in the boundary layer and therefore reducing the flame speed therein, all of which will decrease the possibility of flashback within the annular shroud 90.

As further illustrated in FIG. 4, a center body 94 is provided in the fuel-air mixer 72 that may be in the form of a straight cylindrical section or preferably one that converges substantially uniformly from its upstream end to its downstream end. The center body 94 is preferably sized so as to terminate prior to a downstream end 96 of fuel-air mixer 72. In one embodiment, the center body 94 may preferably include a passage through a tip thereof in order to admit air of a relatively high axial velocity into the combustion chamber 76 adjacent the center body 94, this particular embodiment being capable of decreasing the local fuel/air ratio to help push the flame downstream of the center body tip.

The center body 94 may further include a plurality of orifices positioned preferably immediately downstream of the inner swirler 80 from which fuel can also be injected into the fuel-air mixer 72. It will be understood that if gaseous and liquid fuels are to be injected within the fuel-air mixer 72, the gaseous fuel will preferably be injected through the swirler vane passages and the liquid fuel will be injected through the orifices disposed in the center body 94. Accordingly, it will be understood that the change of fuel types may be accomplished rather quickly simply by increasing the amount of fuel injected through the orifices disposed in the center body 94 while correspondingly decreasing the amount of fuel injected through the vanes.

Figure 5:
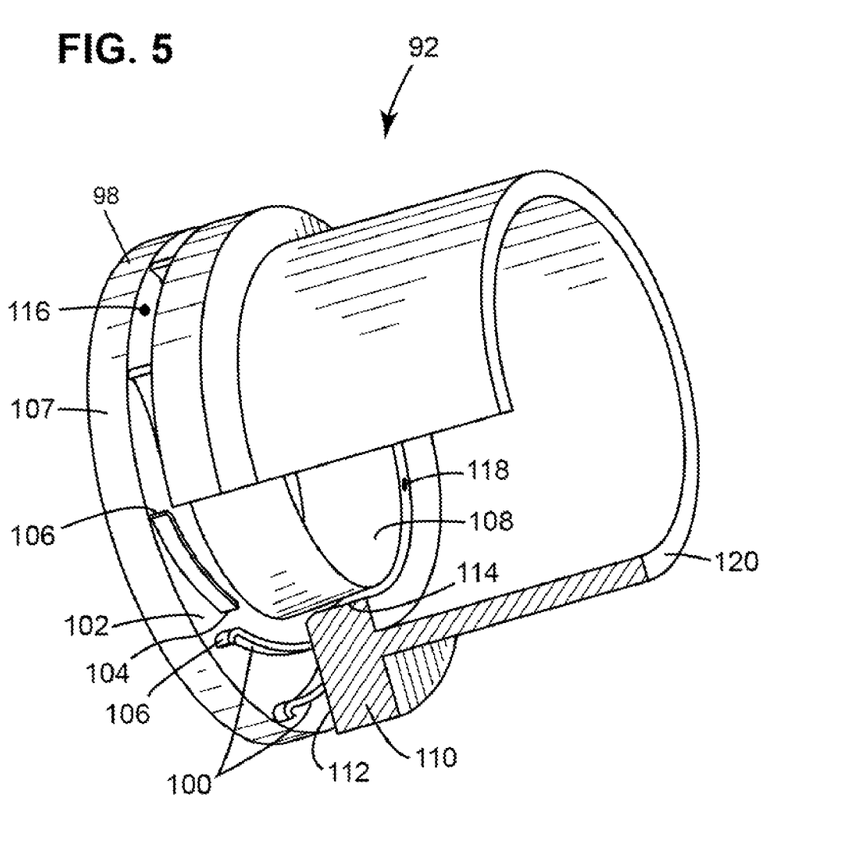
FIG. 5 illustrates a perspective view of a radial swirler of the fuel-air mixer of FIG. 4.

As further illustrated in FIG. 4, between the fuel shroud 86 and the annular shroud 90, the fuel-air mixer 72 includes a radial swirler 92. As previously explained, the fuel introduced in either the inner or outer swirlers 80 and 82 has a tendency to accumulate toward the surface of the annular shroud 90, thus creating a region with a high concentration of fuel at the downstream end 96 of the annular shroud 90. The increased fuel concentration near the exit of the annular shroud 90 may not only increase the likelihood of flash back into the annular shroud 90, but also increase the amount of $NO_x$ formed in the combustion chamber 76. One of the advantageous feature of the radial swirler 92 is that air introduced therethrough enhances fuel air mixing near the surface of the annular shroud 90, thereby reducing and/or eliminating the regions with high fuel concentration at the exit of the annular shroud 90 and thus reducing the overall amount of $NO_x$ formed in the combustion chamber 76. FIG. 5 shows a perspective view of the radial swirler 92.

As shown in FIG. 5, the radial swirler 92 includes a first ring 98 disposed at an upstream end thereof having a plurality of vanes 100 disposed on an outer surface 102. Each vane 100 is disposed on the outer surface 102 so as to extend circumferentially around the axial axis A of the fuel-air mixer 72 with each first end portion 104 of each vane 100 being located radially inward from a second end portion 106 of each vane 102 positioned next to an outer edge 107 of the first ring 98. As illustrated, the first ring 98 also includes an annular lip 108 extending axially from an inner edge of the first ring 98. Another component of the radial swirler 92 is a second ring 110 disposed axially away from the first ring 98 so as to form a gap therebetween extending both along a radial direction and an axial direction. As shown, a first surface 112 of the second ring 110 extends radially inward, forming a radially extending gap 116 where the plurality of vanes 100 is disposed. A second surface 114 of the second ring 110 extends axially so as to form an axially extending gap 118 with the annular lip 108 of the first ring 98. The second ring 110 also includes a sleeve 120, inside of which the annular shroud 90 of the fuel-air mixer 72 is disposed when assembling the fuel-air mixer 72.

The axial location of the radial swirler 92 along the fuel-air mixer 72 relative to the position of the inner and outer swirlers 80 and 82 and/or the degree of radial rotation of the airflow leaving the radial swirler 92 may be determined based on the desired level of mixing of the fuel-air mixture at the downstream end 96 of the fuel-air mixer 72, particularly in the region next to the wall of the annular shroud 92. In addition, the geometry and dimensions of the radial swirler 92 may be selected/optimized based upon a desired premixing efficiency and the operational conditions including factors such as, but not limited to, fuel pressure, fuel temperature, temperature of incoming air, and fuel injection velocity. Examples of fuel include natural gas, high hydrogen gas, hydrogen, biogas, carbon monoxide and syngas. However, a variety of other fuels may also be employed.

The above-described fuel-air mixer 72 is particularly suitable for use in integrated gasification combined cycles, or IGCC, which are cycles having a gas turbine driven by the combustion of a fuel that result from the gasification of a solid fuel, such as coal, while the exhaust gases from the gas turbine are heat exchanged with water/steam to generate superheated steam to drive a steam turbine. The gasification portion of the IGCC plant produces a clean coal gas by combining coal with oxygen in a gasifier to produce the gaseous fuel, mainly hydrogen and carbon monoxide, or syngas. A gas cleanup process then cleans the syngas, which is subsequently used in the combustor of the gas turbine to produce electricity. IGCC plants typically have higher efficiencies and lower emissions with higher output. The higher output is accomplished in IGCC plants when Nitrogen obtained from an Air Separation Unit, or ASU, is introduced in the combustor of the gas turbine, thereby increasing the mass flow rate through the gas turbine and reducing the overall combustion temperature and oxygen concentration by vitiating the air used for combustion. The fuel-air mixer 72 according to the embodiments of the disclosed invention is suitable for use in IGCC plants. In particular, the fuel-air mixer 72 may be used in the gas turbine combustor and Nitrogen may be introduced in the radial swirler 92 when burning syngas, thus helping to decrease the high fuel concentration near the wall and to enhance fuel air mixing properties. This radial swirler can also be utilized such that nitrogen can flow through and mix with hydrogen and air in the shroud during the combustion of high hydrogen, again avoiding localized high equivalence ratio regions at the exit of the fuel-air mixer.

In typical IGCC gas turbine combustors, hydrogen and nitrogen are introduced together through the fuel injection ports in the inner and outer swirlers 80 and 82. In some of the embodiments disclosed, instead of mixing hydrogen with nitrogen and introducing the mixture through the fuel ports, hydrogen containing carbon cleaned syngas is supplied to the fuel ports and nitrogen is either injected by the radial swirler or supplied with the incoming air, thus vitiating the air in order to reduce the overall availability of oxygen thereby reducing the $NO_x$ levels by as much as 70% compared to the conventional levels. In one of the embodiments of the invention, the NOx level at the exit of the combustor is 3-5 ppm or lower. Such an improvement in performance is accomplished while the vitiated air provides an enhanced resistance to flashback and flame holding in the annular shroud 90 of the fuel-air mixer 72. Nevertheless, although the above-summarized advantages are clear for IGCC plants, those of ordinary skill in the art will understand that the disclosed fuel-air mixers may be used to retrofit current combustors of power producing gas turbines.

The fuel-air mixers described above may also be employed in gas-to-liquid system in order to enhance the premixing of oxygen and natural gas prior to reaction in a combustor of the system. Typically, a gas-to-liquid system includes an air separation unit, a gas processing unit and a combustor. In operation, the air separation unit separates oxygen from air and the gas-processing unit prepares natural gas for conversion in the combustor. The oxygen from the air separation unit and the natural gas from the gas-processing unit are directed to the combustor, where the natural gas and the oxygen are reacted at an elevated temperature and pressure to produce a synthesis gas. In this embodiment, the fuel-air mixer is coupled to the combustor to facilitate the premixing of oxygen and the natural gas prior to reaction in the combustor. Further, the radial swirler 92 of the fuel-air mixer facilitates the entrainment of incoming natural gas to enable the mixing of the natural gas and oxygen at high fuel-to-oxygen equivalence ratios (e.g. about 3.5 up to about 4 and beyond) to maximize syngas production yield while minimizing residence time. In certain embodiment, steam may be added to the oxygen or the fuel to enhance the process efficiency.

The synthesis gas is then quenched and introduced into a Fischer-Tropsh processing unit, where through catalysis, the hydrogen gas and carbon monoxide are recombined into long-chain liquid hydrocarbons. Finally, the liquid hydrocarbons are converted and fractionated into products in a cracking unit. Advantageously, the fuel-air mixer having the radial swirler generates rapid premixing of the natural gas and oxygen and a substantially short residence time in the gas to liquid system.

The various aspects of the method described hereinabove have utility in different applications such as combustors employed in gas turbines and heating devices, such as furnaces. Furthermore, the technique described here enhances the premixing of fuel and air prior to combustion, thereby substantially reducing emissions and enhancing the efficiency of gas turbine systems. The premixing technique can be employed for different fuels such as, but not limited to, gaseous fossil fuels of high and low volumetric heating values including natural gas, hydrocarbons, carbon monoxide, hydrogen, biogas and syngas. Thus, as already explained, the fuel-air mixer may be employed in fuel flexible combustors for integrated gasification combined cycle (IGCC) for reducing pollutant emissions. In certain embodiments, the fuel-air mixer is employed in aircraft engine hydrogen combustors and other gas turbine combustors for aero-derivatives and heavy-duty machines. Further, the fuel-air mixer may be utilized to facilitate partial mixing of streams such as oxy-fuel that will be particularly useful for carbon dioxide free cycles and exhaust gas recirculation.

Thus, the premixing technique based upon the additional radial swirler described above enables enhanced premixing and flame stabilization in a combustor. Further, the present technique enables reduction of emissions, particularly $NO_x$ emissions from such combustors, thereby effecting the operation of the gas turbine in an environmentally friendly manner. In certain embodiments, this technique facilitates minimization of pressure drop across the combustors, more particularly in hydrogen combustors. In addition, the enhanced premixing achieved through the additional radial swirler facilitates enhanced turndown, flashback resistance and increased flameout margin for the combustors.

In the illustrated embodiments, the better mixing of fuel and air allows for better turndown and permitting operation on natural gas and air mixtures having an equivalence ratio as low as about 0.2. Additionally, the flameout margin is significantly improved as compared to existing systems. Further, as described earlier, this system may be used with a variety of fuels, thus providing enhanced fuel flexibility. For example, the system may employ either natural gas or $H_2$, for instance, as the fuel. The fuel flexibility of such system eliminates the need of hardware changes or complicated architectures with different fuel ports required for different fuels. As described above, the described fuel-air mixers may be employed with a variety of fuels, thus providing fuel flexibility of the system. Moreover, the technique described above may be employed in the existing can or can-annular combustors to reduce emissions and any dynamic oscillations and modulation within the combustors. Further, the illustrated device may be employed as a pilot in existing combustors.

Methods for premixing a fuel and an oxidizer in a combustion system are also within the scope of the embodiments of the invention disclosed, such methods including the steps of drawing a first stream of oxidizer inside an annular shroud of a fuel-air mixer, swirling a first portion of the first stream of oxidizer in a first swirler in a first direction, swirling a second portion of the first stream of oxidizer in a second swirler in a second direction, the second direction being opposite to the first direction, injecting the fuel into the fuel-air mixer from a fuel shroud, drawing a second gaseous stream inside the annular shroud, and swirling the second gaseous stream in a third swirler, the third swirler being disposed downstream of the axial location of the fuel shroud and the first and second swirlers, the second gaseous stream being drawn from a region outside the annular shroud, and the swirling of the second gaseous stream being such as to control a fuel concentration near a wall of the annular shroud at an exit of the annular shroud. In the step of drawing a first stream of oxidizer, such oxidizer may include air or an oxidizer having a volumetric content of about 10% oxygen. In addition the fuel may include syngas and the oxidizer a high-purity oxygen for use in oxy-fuel combustors or the fuel may include a syngas and the second gaseous stream is a stream of nitrogen.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims. In addition, while the present invention has been shown in the drawings and fully described above with particularity and detail in connection with what is presently deemed to be practical and several of the exemplary embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed is:

1. A fuel-air mixer, comprising:
    an annular shroud having a circular cross section defined by a wall, the annular shroud having an axial axis extending along an axial direction, a radial axis extending along a radial direction, and upstream and downstream end portions;
    a first swirler disposed at the upstream end portion of the annular shroud;
    a second swirler disposed at the upstream end portion of the annular shroud outwardly from the first swirler in the radial direction;
    a hub separating the first and second swirlers, the hub being configured to allow independent rotation of first and a second portions of a first gas stream entering the annular shroud at the upstream end portion thereof, the first and second portions of the first gas stream being rotated by the first and second swirlers, respectively, in which the hub is further configured such that the first and second portions of the first gas stream accumulate at a region adjacent a wall of the annular shroud;
    a center body extending along the axial axis of the annular shroud;
    a fuel shroud disposed at the upstream end portion of the annular shroud outwardly from the second swirler in the radial direction and circumferentially around the annular shroud, the fuel shroud being configured to inject a fuel into the annular shroud to be mixed with the first and second portions of the first gas stream and a second gas stream upstream of a combustion chamber; and
    a third radial swirler is disposed downstream of the first and second swirlers, the third swirler having an axial and radial gap adjacent the wall of the annular shroud and being configured to introduce the second gas stream from a region outside the wall of the annular shroud to the first and second portions of the first gas stream to allow an independent rotation of the first and second gas stream and the fuel from the fuel shroud wherein the second gas stream enters the annular shroud at a region adjacent and within the wall of the annular shroud.

2. The fuel-air mixer according to claim 1, wherein the first and second swirlers are counter-rotating and an axial distance from the third swirler to the first and second swirlers is determined based on a desired fuel concentration value at an exit plane of the annular shroud.

3. The fuel-air mixer according to claim 1, wherein the first and second swirlers are selected from the group consisting of radial swirlers, axial swirlers, and radial/axial swirlers and the third swirler is a radial swirler.

4. The fuel-air mixer according to claim 1, wherein the first swirler comprises vanes and the fuel shroud is in flow communication with the vanes of the first shroud.

5. The fuel-air mixer according to claim 1, wherein the second swirler comprises vanes and the fuel shroud is in flow communication with the vanes of the second shroud.

6. The fuel-air mixer according to claim 1, wherein the first and second swirlers comprise first and second sets of vanes, respectively, and the fuel shroud is in flow communication with the first and second sets of vanes.

7. The fuel-air mixer according to claim 1, wherein the fuel injected into the annular shroud from the fuel shroud is a syngas and the second gas stream is a stream of nitrogen gas to vitiate an amount of oxygen in the first gas stream to control an amount of $NO_x$ formed in a combustion region located downstream of the annular shroud.

8. The fuel-air mixer according to claim 1, wherein the second gas stream is a stream of air and the independent rotation of the second gas stream is configured to reduce a local fuel concentration at an exit of the annular shroud in a region adjacent the wall of the annular shroud.

9. The fuel-air mixer according to claim 1, wherein the fuel is selected from the group consisting of natural gas, high hydrogen gas, hydrogen, bio gas, carbon monoxide, syngas, and a combination thereof.

10. The fuel-air mixer according to claim 1, the third swirler further comprising:
   a first ring having a plurality of vanes disposed on an outer surface thereof and an annular lip extending axially from an inner edge of the first ring; and
   a second ring disposed axially away from the first ring so as to form a gap therebetween containing the plurality of vanes disposed on the outer surface of the first ring, the second ring including a first surface extending radially inward so as to form a first portion of the gap and a second surface extending axially so as to form a second portion of the gap, the second ring also including a sleeve configured to receive the annular shroud of the fuel-air mixer.

11. A gas turbine combustor comprising the fuel-air mixer of claim 1.

12. The gas turbine combustor of claim 10, wherein the gas turbine combustor comprises a can combustor, or a can-annular combustor, or an annular combustor.

13. A gas turbine, comprising:
   a compressor;
   a combustor in flow communication with the compressor configured to burn a premixed mixture of fuel and air, the combustor including a fuel-air mixer disposed upstream of the combustor, the fuel-air mixer including:
      an annular shroud having a circular cross section defined by a wall, the annular shroud having an axial axis extending along an axial direction, a radial axis extending along a radial direction, and upstream and downstream end portions,
      a first swirler disposed at the upstream end portion of the annular shroud,
      a second swirler disposed at the upstream end portion of the annular shroud outwardly from the first swirler in the radial direction,
      a hub separating the first and second swirlers, the hub being configured to allow independent rotation of first and a second portions of a first gas stream entering the annular shroud at the upstream end portion thereof, the first and second portions of the first gas stream being rotated by the first and second swirlers, respectively, in which the hub is further configured such that the first and second portions of the first gas stream accumulate at a region adjacent a wall of the annular shroud;
      a center body extending along the axial axis of the annular shroud,
      a fuel shroud disposed at the upstream end portion of the annular shroud outwardly from the second swirler in the radial direction and circumferentially around the annular shroud, the fuel shroud being configured to inject a fuel into the annular shroud to be mixed with the first and second portions of the first gas stream and a second gas stream upstream of a combustion chamber; and
      a third radial swirler disposed in the annular shroud downstream of the first and second swirlers, the third swirler having an axial and radial gap adjacent the wall of the annular shroud and being configured to introduce the second gas stream from a region outside the wall of the annular shroud to the first and second portions of the first gas stream to allow an independent rotation of the first and second gas stream and the fuel from the fuel shroud wherein the second gas stream entering the annular shroud at a region adjacent and within the wall of the annular shroud; and
   a turbine located downstream of the combustor and configured to expand a third gas stream exiting the combustor.

14. A gas-to-liquid system, comprising:
   an air separation unit configured to separate oxygen from air;
   a gas processing unit for preparing natural gas;
   a combustor for reacting oxygen with the natural gas at an elevated temperature and pressure to produce a synthesis gas enriched with carbon monoxide and hydrogen gas;
   a fuel-air mixer disposed upstream of the combustor to facilitate the premixing of oxygen and the natural gas prior to reaction in the combustor, the fuel-air mixer including:
      an annular shroud having a circular cross section defined by a wall, the annular shroud having an axial axis extending along an axial direction, a radial axis extending along a radial direction, and upstream and downstream end portions,
      a first swirler disposed at the upstream end portion of the annular shroud,
      a second swirler disposed at the upstream end portion of the annular shroud outwardly from the first swirler in the radial direction,
      a hub separating the first and second swirlers, the hub being configured to allow independent rotation of first and a second portions of a first gas stream entering the annular shroud at the upstream end portion thereof, the first and second portions of the first gas stream being rotated by the first and second swirlers, respectively, in which the hub is further configured such that the first and second portions of the first gas stream accumulate at a region adjacent a wall of the annular shroud;
      a center body extending along the axial axis of the annular shroud,
      a fuel shroud disposed at the upstream end portion of the annular shroud outwardly from the second swirler in the radial direction and circumferentially around the annular shroud, the fuel shroud being configured to inject a fuel into the annular shroud to be mixed with the first and second portions of the first gas stream and a second gas stream upstream of a combustion chamber, and a third radial swirler disposed in the annular shroud downstream of the first and second swirlers, the third swirler having an axial and radial gap adjacent the wall of the annular shroud and being configured to introduce a second gas stream from a region outside the wall of the annular shroud to the first and second portions of the first gas stream to allow an independent rotation of the first and second gas stream and the fuel from the fuel shroud wherein the second gas stream entering the annular shroud at a region adjacent and within the wall of the annular shroud; and a turbo-expander in flow communication with the combustor for extracting work from and for quenching the synthesis gas.

15. The gas to liquid system of claim 14, further comprising a Fischer-Tropsch processing unit for receiving the quenched synthesis gas and for catalytically converting the quenched synthesis gas into a hydrocarbon fluid.

16. The gas to liquid system of claim 14, further comprising a cracking unit for fractioning the hydrocarbon fluid into at least one useful product.

* * * * *